United States Patent [19]

Garfinkle

[11] Patent Number: 5,592,293
[45] Date of Patent: Jan. 7, 1997

[54] SCANNING TOMOGRAPHICAL IMAGING TELESCOPE

[76] Inventor: Moishe Garfinkle, P. O. Box 15855, Philadelphia, Pa. 19103

[21] Appl. No.: 328,109

[22] Filed: Oct. 24, 1994

Related U.S. Application Data

[63] Continuation-in-part of Ser. No. 8, Jan. 4, 1993, abandoned.
[51] Int. Cl.$^6$ .................................................. G01B 9/02
[52] U.S. Cl. .................................... 356/359; 356/345
[58] Field of Search ................................. 356/345, 346, 356/359, 360; 359/223, 244, 365, 366, 429, 430, 847, 848, 858, 859, 867, 876

[56] References Cited

U.S. PATENT DOCUMENTS 4,136,954  1/1979  Jamieson ..................... 356/346

*Primary Examiner*—Samuel A. Turner
*Assistant Examiner*—Robert Kim

[57] ABSTRACT

An imaging interferometer is disclosed in which incident rays are focused by separate tangential and sagittal plano-cylindrical ribbon reflectors aligned with a common optical axis, with rotation of the interferometer about its optical axis allowing the entire object field to be scanned, thereby dispensing entirely with the circular aperture. In this manner high resolutions and wavefront continuity can be achieved without the weight or complications associated with single or multiple circular apertures.

6 Claims, 4 Drawing Sheets

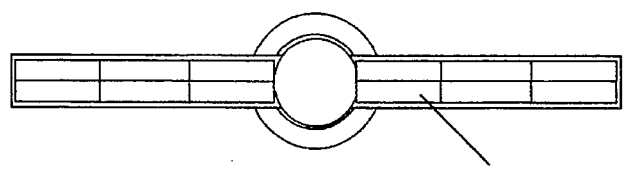
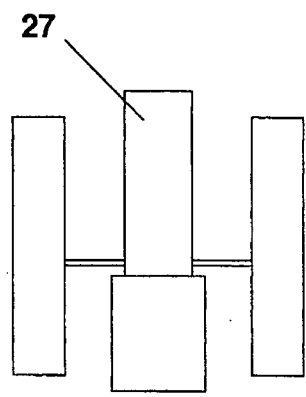
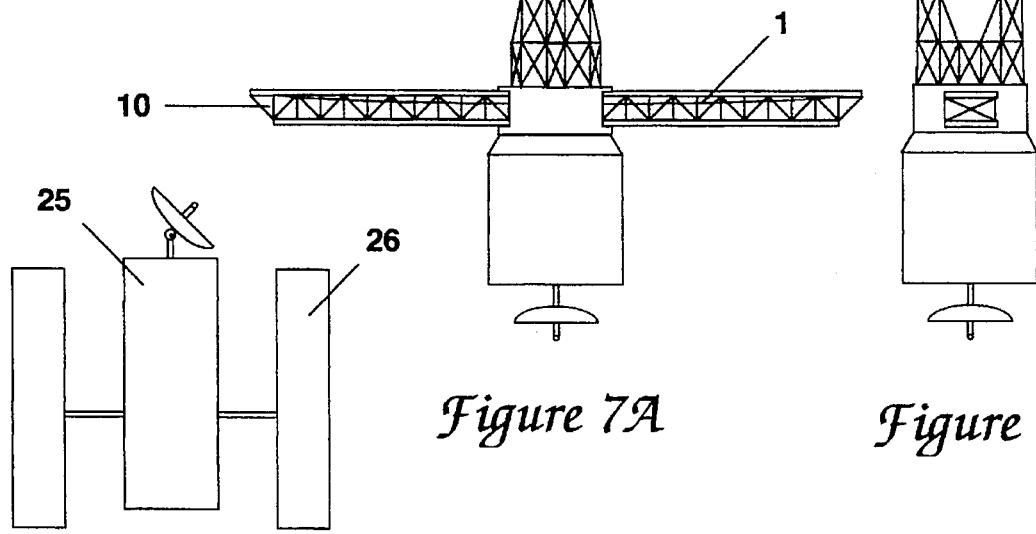
Figure 7C
Figure 9
Figure 7A
Figure 7B
Figure 8

SCANNING TOMOGRAPHICAL IMAGING TELESCOPE

This is a continuation-in-part of application Ser. No. 8/000,008 filed Jan. 4, 1993 which is now abandoned.

BACKGROUND OF THE INVENTION

Although the Hubble Space Telescope has an aperture one-half that of the 5-m Hale Reflector and only one-quarter that of the 10-m Keck reflector this extraordinary orbiting telescope has returned images with resolutions notably superior to those presently attainable from significantly larger terrestrial telescopes. This performance affords a glimpse at the science potential for orbiting telescopes with significantly greater apertures than even the 10-m Keck when free of the deleterious effects of atmospheric absorption and turbulence. However in terms of practical launch requirements and orbital erection necessities, as well as economic realities, the the conventional telescope optical arrangement based on the monolithic circular aperture, an arrangement astronomers have relied on since Galileo and Newton, is not particularly suitable for telescopes significantly larger than the Keck. Even for terrestrial telescopes viability may not extend much beyond the Keck aperture, if in fact a 10-m monolithic aperture can be fabricated. Nevertheless the need for significantly greater resolving power than presently available is imperative. For example, consider the diffraction-limited resolution of a simulated 15th magnitude quasar possible with 2.5-m and 8-m apertures, as shown in FIG. 1. These resolutions are compared to that possible with a 25-m aperture, an aperture extent simply outside the realm of present technology in regard to the circular aperture.

Beyond 10 meters rigid monolithic mirrors become essentially impractical, if not from practical fabrication, transport and erection considerations, then from the significant gravitational gradient distortions and temperature variations across the 5-meter extent of the mirror would ruinously distort the intrinsic figure without corrective measures, whether the instrument were terrestrial or orbital.

In a significant departure from the monolithic aperture the Keck 10-m reflector relies on an array of hexagonal mirrors. The Hubble 2.4-m and Hale 5-m reflectors are shown for comparison with the Keck in FIG. 2 so as to appreciate the enormity of any projected 25-m instrument. Because final figuring of the Keck is accomplished by distortion of the individually figured mirrors using servomechanical actuators, temperature and gravitational distortions can be compensated for. However the focusing and aligning algorithms for compensation are highly complex. Moreover the mirrors must be first mechanically figured, a considerable difficulty because of their non-symmetric configuration and non-circular perimeter. Nevertheless future reliance ostensibly is to be placed on the sectored-mirror circular aperture for very large terrestrial and orbital telescopes.

Accordingly the Keck configuration would be scaled up from a 10-meter to a 25-meter aperture. Two basic sectored mirror arrangements that represent extremities in the Keck configuration can be considered. A 36-sector design would be essentially the existing Keck reflector simply scaled up to 25 meters with each sector mechanically figured and servomechanically distorted for final figuring. However the mirrors would be particularly difficult to figure for a 25-m aperture with each sector significantly larger than the Hubble's mirror.

Alternatively, an equivalent aperture could be attained using 176 Keck-size sectors, each mechanically figured and individually distorted. However, because of practical mechanical and electronic limitations on the compensating system required for just 36 Keck-size mirrors, the full imaging potential of the Keck is rarely achieved in practice, and would be essentially unachievable for 176 sectors. Hence, for all practical purposes apertures significantly larger than the Keck 10-m are beyond present technology. In light of these difficulty alternative arrangements are being considered, all involving partially-filled apertures, still based on the circular aperture however.

SUMMARY OF THE INVENTION

All astronomical telescope utilize the circular aperture singularly or on multiples and accordingly their optical paths of are symmetrical about the optical axis of the circular reflector. That is, equivalent optical paths are identical in the tangential and sagittal planes shown in FIG. 3A. Hence the incident flux is focused simultaneously in the tangential and sagittal planes. Consider now the STII with a continuous primary tangential reflector to focus only in the tangential plane and an orthogonal sagittal reflector to focus only in the sagittal plane. As illustrated in FIG. 3B the optical elements are concave ribbon mirrors with plano-cylindrical curvature and a common optical axis.

The incident rays are focused by the tangential plano-concave reflector only in the tangential plane. To focus in the sagittal direction requires the sagittal plano-concave reflector to be orthogonally oriented to the tangential reflector, with both reflectors orthogonal to their common optical axis. Accordingly the incident flux is focused at the detector in both the tangential and sagittal direction, however not simultaneously as in circular aperture practice.

The continuous ribbon reflectors are fiat when unconstrained and are curved in only one dimension by an array of servomechanical actuators which support the reflectors and thereby permit full active figuring in situ. The elastic constraint of the simple-curved ribbon itself will aid in maintaining the required plano-cylindrical curvature. Moreover, with this support arrangement the servomechanical actuators can also readily adjust each ribbon reflector axially (piston effect) to provide wavefront alignment. With essentially one-dimensional optical correction required the correction algorithm to electronically figure the STII continuous reflectors by controlling the axial extension of the actuators will be considerably less complex than required for conventional monolithic mirrors, and even more advantageous compared to the multiple requirements with segmented mirror two-dimensional corrections, yet still providing wavefront continuity. By employing Shack-Hartman lenslets at strategic positions on each STII reflector active figuring would be significantly simpler than that required for each of the hexagonal complexly-curved sectors of the Keck. Consequently the control circuitry and algorithm for active optics correction would be significantly simplified.

Both the structural flexure and oscillation period, amplitude and duration of an astronomical telescope are related to the mass of the optical elements, their cantilever support arrangement, and the elastic moduli of their support structure. In these regards the STII arrangement would be substantially superior to the conventional arrangement, particularly important with respect to large instruments. The mass of the ribbon reflectors of an STII with their electronic deforming system will be an insubstantial fraction of the mass of the mirrors of a significantly smaller conventional telescope.

Because the STII reflectors comprise ribbon mirrors considerably more flexibility is present in the choice of materials. A metal ribbon has significant advantages not only because mechanical and electrochemical polishing techniques have advanced to the point where $\lambda/10$ surface smoothness can be achieved, but also because of their significantly higher thermal diffusivity compared to conventional ceramics and glasses. The higher thermal expansion of metals compared to ceramics can be compensated for by the servomechanical figuring algorithm.

The tangential resolution of the STII depends on the tangential extent of the tangential ribbon reflector which is equivalent to the diameter of a circular aperture, while the sagittal resolution depends on the sagittal extent of the tangential reflector. Hence resolution is relatively poor in the sagittal plane compared to the tangential plane. The result is a useful interference pattern only in the tangential direction. Essentially the Fraunhofer interference pattern at the focal plane in smeared in the sagittal direction, and accordingly an information-useful image of the object examined cannot be directly produced by the STII. However by taking discrete exposures of the object over a scanning range of 180° by synchronous rotation of all of the optical elements of the STII about their common optical axis as shown in FIG. 3B all of the information would be available to generate an image as it would appear at the focal plane of a circular aperture of equal aperture extent.

By use of computer simulation all of the information gathered through a 180° scanning range in discrete 1° increment exposures by a hypothetical 25×2.5 meter STII was applied to the Expectation Maximization tomographical image deconvolution algorithm to reconstruct an image similar to that shown in FIG. 1 as viewed by a 25-meter circular aperture. The Expectation Maximization algorithm, developed to interpret medical CAT scan X-Ray projections, reconstructed an image from the STII exposures essentially indistinguishable from the circular aperture image.

For terrestrial telescopes wavefront distortion arising from atmospheric turbulence can be somewhat corrected for by adaptive optics, which should be particularly applicable to the STII as tangential and sagittal Fraunhofer diffraction patterns are orthogonal, unlike the circular aperture. Although subapertures must be defined in both the tangential and sagittal directions because each diametric extent of atmospheric area within which the wavefront is coherent affects the entire image structure, nevertheless for one-dimensional STII imaging it is only necessary to correct for local tilt in the tangential direction.

The simplified electronic processing should decrease the time delays inherent in electronic processors. With one-dimensional compensation mirror actuators can be arranged in a rectilinear arrangement because only simple curvatures of the mirror is required, probably also reducing inertial delays. Hence the entire adaptive system is altogether optically, mechanically and electronically simplified compared to the requirements for the circular aperture.

Accordingly the unique features of the scanning tomographical imaging instrument are as follows:

1) all of the principal optical elements of are plano-cylindrical reflectors on a common optical axis of rotation;
2) the tangential plano-cylindrical reflectors are orthogonal to the sagittal reflectors;
3) all of the plano-cylindrical reflectors are mechanically figured from flat mirrors;
4) the optical elements can be figured to a Cassegrainian optical arrangement;
5) the optical elements can be arranged to eliminate spurious diffraction effects;
6) images can be reconstructed using tomographical deconvolution techniques; and
7) adaptive optical correction is required only in the tangential direction.

OBJECTIVE OF THE INVENTION

Because a massive primary reflector of a conventional astronomical reflector is dispensed with, and consequently the equally massive support structure, an STII will have a fraction of the weight of an equivalent conventional telescope, bringing a 25 meter aperture construction well into the realm of practicality with present technology for either terrestrial or orbital placement.

Beyond the practical advantages of the STII, for a terrestrial mounted STII adaptive optical techniques are now available to improve observational resolution to near diffraction-limited values despite seeing limitations, with this technique particularly suitable to the STII. A wave-front sensor measures phase perturbations across the telescope aperture arising from atmospheric turbulence. These perturbations are detected by measuring the shape of the wave front compared to that from a reference source, such as a guide star adjacent to the celestial body under observation. This information is used to control the configuration of a deformable mirror, essentially reconstructing the wave-front at the focal plane as it had existed before distortion and prior to tomographic reconstruction. Accordingly, in terms of techniques already developed or projected, near diffraction-limited resolution should be possible with the STII with either a terrestrial or orbital placement.

SUMMARY OF THE DRAWINGS

FIG. 7A. Orbital STII front elevation.

FIG. 7B. Orbital STII side elevation.

FIG. 7C. Orbital STII top view.

FIG. 8. Orbital STII power module.

FIG. 9. Orbital Hubble Space Telescope configuration.

Details of the mechanical elements required to support the optical elements disclosed, as well as reflector figuring and telescope control systems, are not shown as these are well known to those knowledgeable in the art.

PREFERRED EMBODIMENTS OF THE INVENTION

Figure 1:
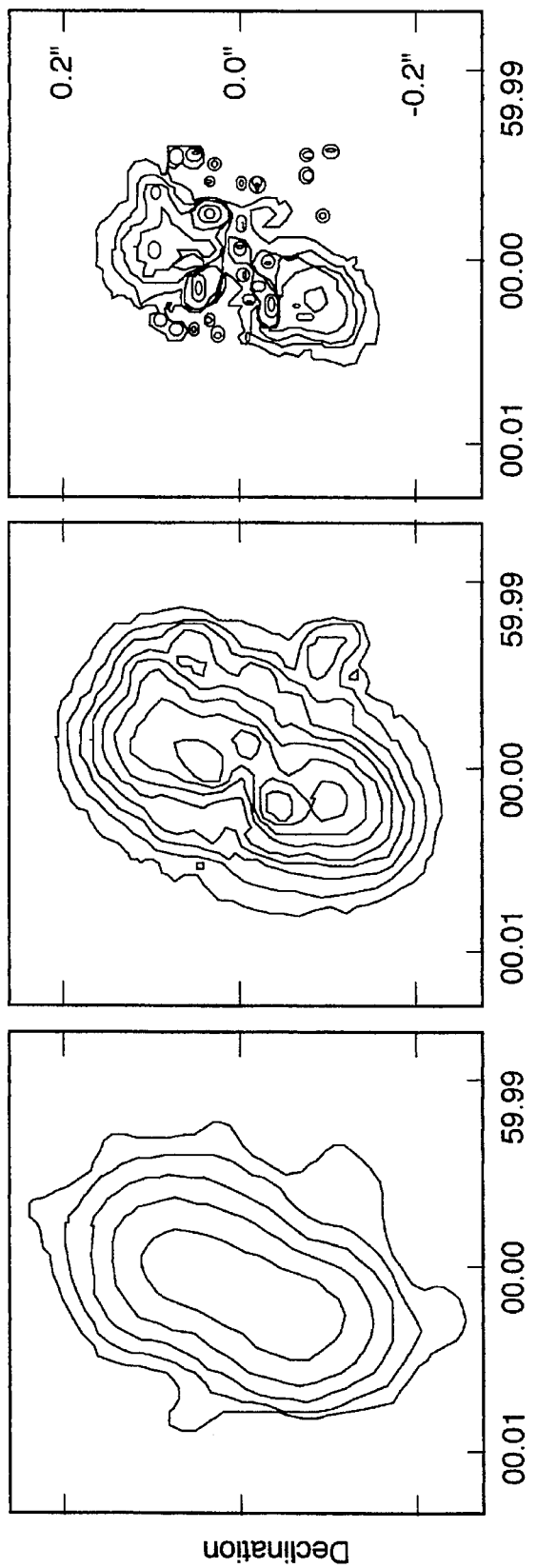
FIG. 1. Simulated resolution of several circular-aperture telescopes.
Figure 2:
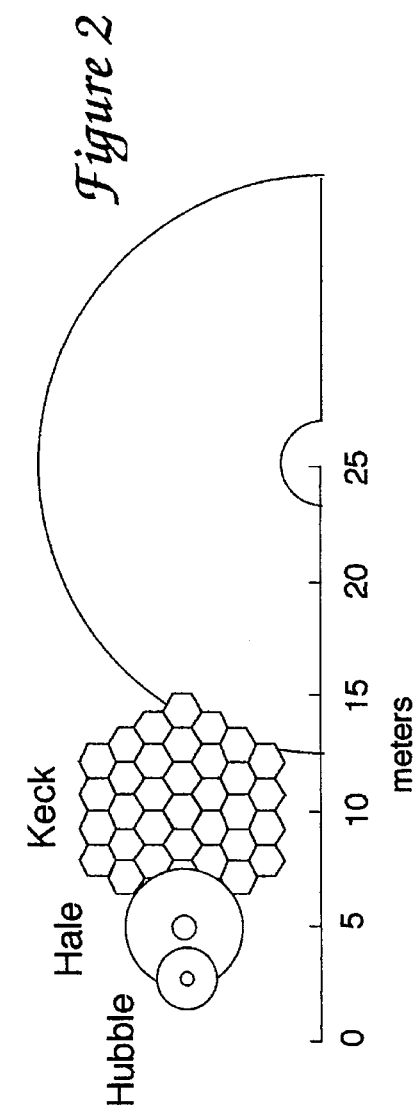
FIG. 2. Relative size of several circular-apertures.
Figure 3A:
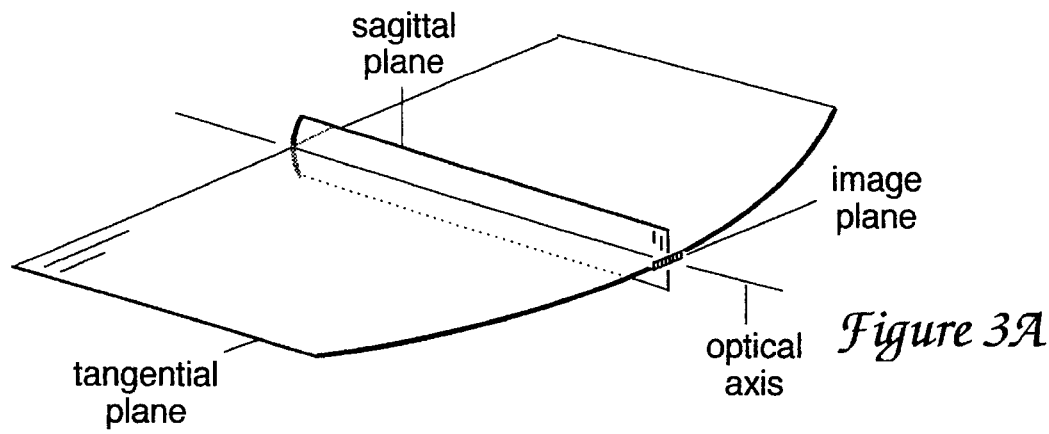
FIG. 3A. Principal optical elements of an STII.
Figure 3B:
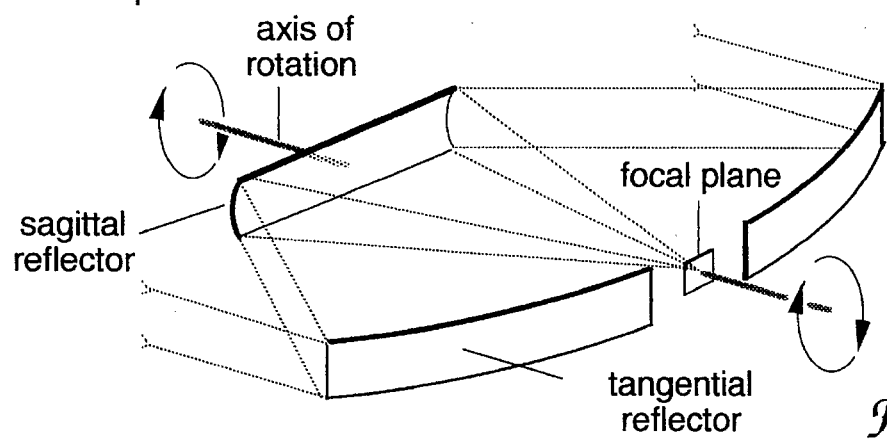
FIG. 3B. Principal optical planes of an STII.
Figure 4:
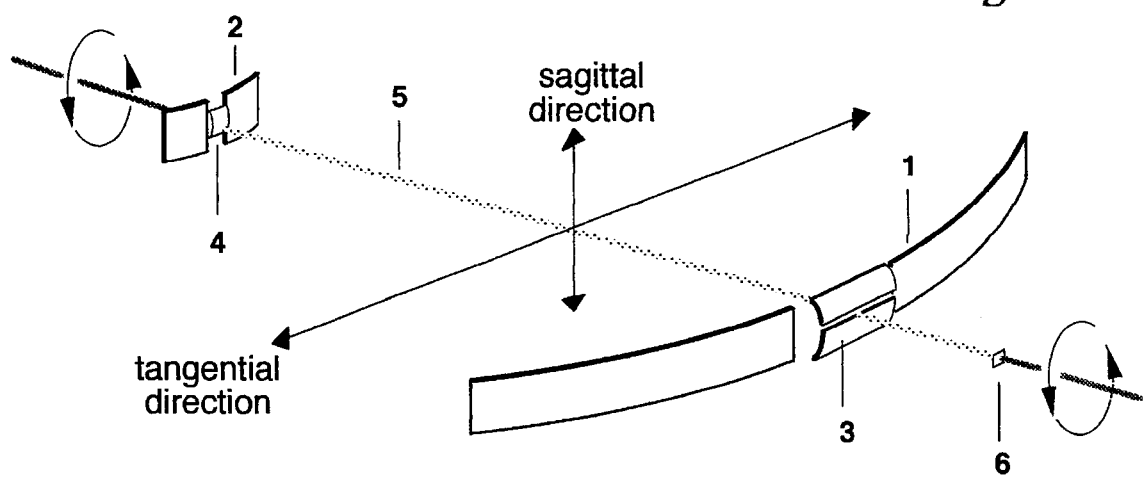
FIG. 4. Cassegrainian optical element arrangement for an STII.

FIG. 4 illustrates the preferred embodiment of the invention, utilizing a cassegrainian reflector arrangement which uses a combination of parabolic and hyperbolic reflectors to accommodate an extended focal length conducive to fine imaging without significant blockage of the primary reflector by the secondary. The reflectors 1, 2, 3 and 4 are coaxial with the optical axis of rotation 5. Unlike conventional mirrors the plano-cylindrical reflectors 1, 2, 3 and 4 have no intrinsic figure but are figured in situ. The incident flux is focused in the tangential plane by the primary tangential plano-concave parabolic reflector 1 and the secondary tangential plano-convex hyperbolic reflector 2 at the cassegrainian focal plane 6. In the sagittal plane the incident flux is focused by the primary sagittal plano-concave parabolic reflector 3 and the secondary sagittal plano-convex hyperbolic reflector 4 at the focal plane 6 in the sagittal plane. Accordingly the optical system comprises superimposed tangential and sagittal Cassegrainian optical elements whose plano-cylindrical reflectors are figured, and therefore focused, independently inasmuch as the tangential reflectors and the sagittal reflectors are orthogonal. Consequently the tangential reflectors have curvature only in the tangential plane and the sagittal reflectors have curvature only in the sagittal plane.

Figures 5A, 5B, 6A, 6B, 6C:
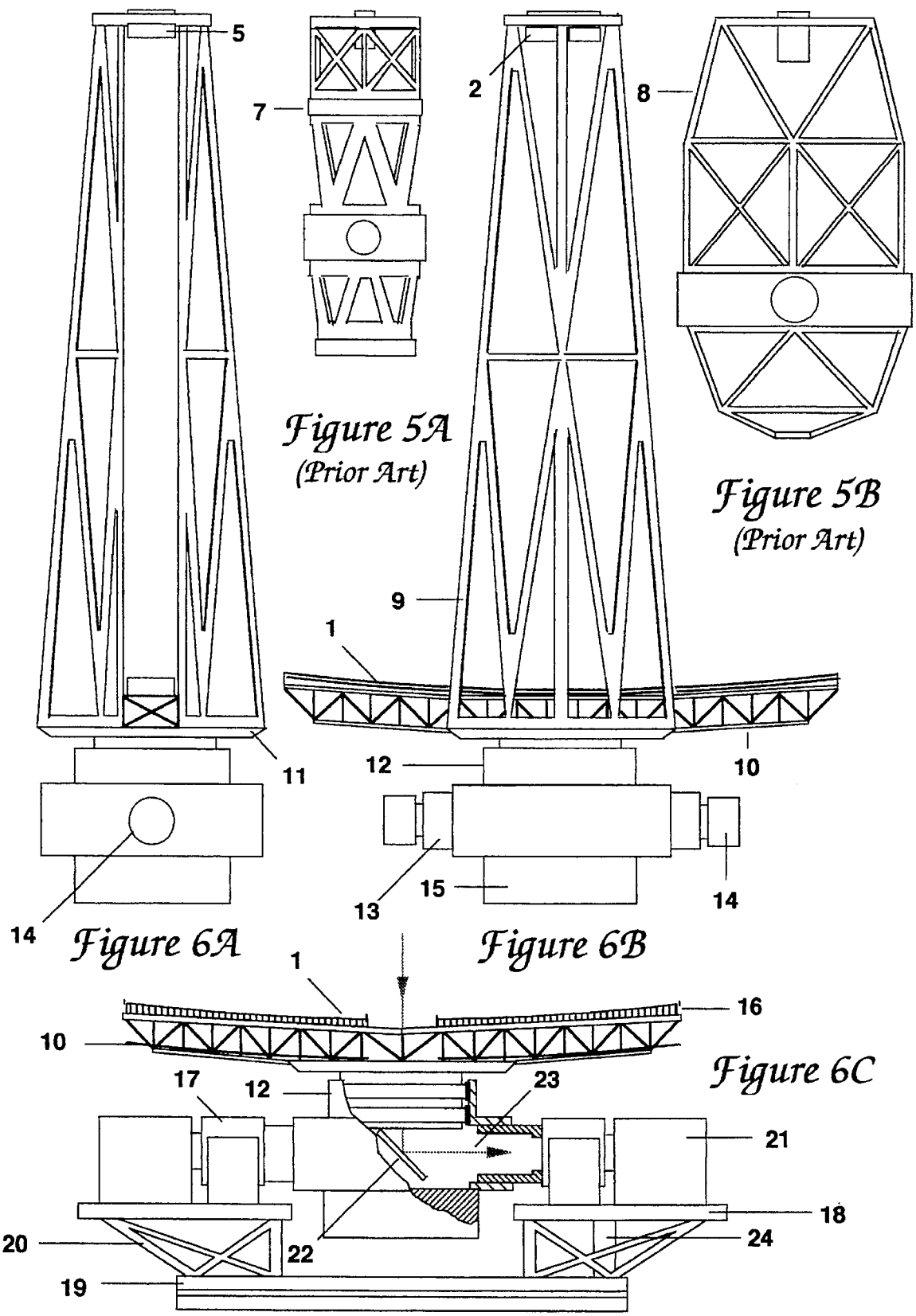
FIG. 5A. Hale 5-meter f/3.6 Serrurier cage.
FIG. 5B. Keck 10-meter f/1.8 Serrurier cage.
FIG. 6A. Terrestrial STII 25-meter f/1.2 Serrurier cage side elevation.
FIG. 6B. Terrestrial STII 25-meter f/1.2 Serrurier cage front elevation.
FIG. 6C. Terrestrial STII 25-meter Nasmyth focus arrangement.

FIGS. 5A and 5B illustrate the comparative Serrurier cage construction of two large operational telescopes: the 5-meter f/3.6 Hale and the 10-meter f/1.8 Keck. These are compared with a projected 25-meter f/1.2 STII shown in FIGS. 6A and 6B. It is evident from the 25-meter tangential extent of the STII primary reflector 1 that simply increasing the size of the Keck cage 8 to that necessary for a 25-meter circular aperture telescope would be a massive undertaking impractical from both technological as well as economical considerations. Moreover, there are no secondary mirror structural supports obstructing the flux path of the STII as evident from FIG. 6A, eliminating spurious diffraction effects, unlike the construction of the conventional Serrurier cages shown in FIGS. 5A and 5B, an important consideration in fine resolution and particularly adaptive optics.

Rather than being supported by cage 9 the support structure 10 of the primary STII reflector 1 is secured directly to the base structure 11. Accordingly cage 9 is required to support only the secondary reflectors 2 and 4, rather than both the secondary and primary reflectors 1, 2, 3 and 4 as required by the conventional cassegrainian optical arrangement of the Hale or the Keck. Consequently the STII cage 9 can be constructed significantly lighter than conventional construction.

The base 11 rotates about the optical axis of the STII within the bearing structure 12. To accommodate declination the base 12 is secured to trunnion 13, which can pivot on trunnion bearings 14. Counterweight 15 is provided to balance the weight of the structure about the trunnion 13.

FIG. 6C illustrates the Nasmyth optical path for an altitude-azimuth mounted STII. The primary reflector 1 is supported by an array of servomechanical actuators 16 secured to support structure 10, actuators 16 being similar to those used in the active figure control of large circular aperture instruments, such as the Keck. However, unlike the mirrors of the Keck or of other telescopes, the reflectors 1, 2, 3 and 4 are fully figured by the actuators 16 to the required plano-cylindrical curvature. The trunnion bearings 14 are held within the trunnion bearing housing 17, with housing 17 secured to Nasmyth platform 18. Platform 18 rotates only in azimuth while supported on rotary table 19 by structure 20, with table 19 secured to a conventional stationary support structure as in conventional altitude-azimuth mounting practice.

Platform 18 supports the principal scientific instruments 21 of the STII at the Nasmyth focus, such as spectrometers, radiometers and the like, aligned with the axis of the trunnion 13. The Nasmyth focus requires a Newtonian flat 22 to intercept the rays 23 and direct them to the instruments 21. Derotation optical elements such as a Dove or Schmidt (Pechan) prism would probably be required in the optical path because of the rotation of the STII. Although a Coudé focus would probably not be required, such a focus could be provided as in conventional practice by light tube 24, equipped with a series of conventional flat mirrors. The tube 24 would pass through the support structure and thence to the conventional azimuth axis of table 19.

To best utilize the advantages of the STII observatory sites with the best terrestrial seeing would of course be preferred. However, looking beyond present practicalities, the STII would be ideal for an extraterrestrial placement. Unlike conventional telescopes, all of the components of an STII would be both relatively light and, when disassembled, sufficiently compact for space vehicle transport using present technology.

FIGS. 7A, 7B and 7C illustrates an orbital STII. Because of the low mass of the reflecting elements, primarily the principal tangential reflectors 1 and 2, the support cage 9 can be lightly constructed. The entire STII rotates as a unit about its optical axis.

Because of axial rotation, solar panels and power controls would not be practical aboard an orbiting STII. Consequently, for these functions a separate power module 25 must be provided to main solar-panels 26 in their proper orientation, as shown in FIG. 8. Power can be transmitted from the module 25 to the STII by microwave radiation using conventional means. The module 25 would also serve as a relay station for transmission and reception of control and telemetry signals from the base station controlling the orbiting STII. The 2.4 meter Hubble Space Telescope 27 is shown in FIG. 9 for a rough size comparison with a 25×2.5 meter STII. Although the STII provides a resolution roughly a magnitude greater than the Hubble 27 and with four times the light-gathering power, the STII is only several-times larger.

For very large instruments the primary aperture 1 would have to be divided in sectors 28 as illustrated in FIG. 7C, but unlike the Keck the sectors are rectangular so that the position sensors, with Shack-Hartman lenslets strategically placed on each sector for alignment, are orthogonal to one another, significantly simplifying the figuring algorithm and phase recovery requirements.

Probable a lunar altitude-azimuth mounting would be ideal for the STII, and would be practical within present technological limitations. With the moon's diminished gravity and lack of atmospheric disturbances, an STII with a 50-meter or even 100-meter aperture would not be outside the limit of present technology considering the in situ figuring capability of the STII. An undisturbed, long period scan with such instruments would permit the imaging of very faint, distance objects with resolutions beyond anything even imaginable at present.

While there have been described what is at present considered to be the preferred embodiment of a scanning tomographical imaging interferometer, it will be obvious to those skilled in the art that various changes and modifications may be made therein without departing from the invention. It is aimed therefore in the appended claims to cover all such changes and modifications as fall within the true spirit and scope of the invention so that others may, by applying current and future knowledge, adopt the same for use under various conditions of service.

What is claimed is:

1. An imaging instrument comprising reflecting means and a focal plane sharing a common optical axis, said reflecting means and focal plane essentially orthogonal to, and in synchronous rotation about, said optical axis, said reflecting means comprising a plurality of tangential plano-cylindrical reflectors and a plurality of sagittal plano-cylindrical reflectors, said tangential reflectors essentially orthogonal to said sagittal reflectors and to said common optical axis, whereupon said tangential reflectors intercept the incident flux from an object and focus said flux on the focal plane solely in the tangential plane and said sagittal reflectors intercept the incident flux from said object and focus said flux on said focal plane solely in the sagittal plane, thereby providing a sequence of exposures upon rotation of said instrument about said optical axis, each said exposures with high resolution in the tangential plane and wavefront continuity at the focal plane in both the tangential and the sagittal planes using only simple-curvature reflectors, with all of the information contained in said sequence of exposures available to generate an image as it would appear at the focal plane of a circular aperture of equal tangential aperture extent wherein said tangential plano-cylindrical reflectors comprise a parabolic plano-concave primary reflector and a hyperbolic plano-convex secondary reflector and said sagittal plano-cylindrical reflectors comprise a parabolic plano-concave primary reflector and a hyperbolic plano-convex secondary reflector, said tangential and said sagittal reflectors so disposed so as to provide a tangential and a sagittal Cassegrainian optical arrangement, said tangential Cassegrainian arrangement essentially orthogonal to said sagittal Cassegrainian arrangement, thereby providing an extended focal length amenable to astronomical observations.

2. An imaging instrument according to claim 1 wherein said image is generated by tomographieal image deconvolution from said information contained in said sequence of exposures made over a range of scanning angles during said synchronous rotation of said reflectors about said optical axis.

3. An imaging instrument according to claim 1 wherein said tangential plano-convex secondary reflector and said sagittal plano-convex secondary reflector are supported without obstructing said flux path by a support structure, thereby eliminating spurious diffraction effects at said focal plane common to the circular aperture.

4. An imaging instrument according to claim 3 wherein said plano-cylindrical reflectors are mirror flats when unconstrained, said mirror flats elastically secured by servomechanical actuators to said support structure, thereby allowing full in situ figuring of said mirror flats to provide 1) focusing of resultant said plano-cylindrical reflectors and to provide 2) axial adjustment of said plano-cylindrical reflectors to allow phase alignment.

5. An imaging instrument according to claim 3 wherein said tangential plano-concave primary reflector is divided into essentially rectangular sectors, whereupon position sensors aligning said sectors are orthogonal to one another, thereby significantly simplifying the figuring and phase recovery requirements.

6. An imaging instrument according to claim 3 wherein correction for wavefront distortion arising from atmospheric turbulence is effected only for tilt in the tangential direction, thereby simplifying the electronic processing required for adaptive optic correction, whereby the time delays inherent in electronic processors are reduced, and inasmuch as compensation mirror actuators can be arranged in a rectilinear arrangement because only simple curvatures of the mirror is required, inertial delays are reduced.

* * * * *